March 7, 1967 W. H. BAYNES 3,308,277

TIMING DEVICE UTILIZING ELECTRO-MECHANICAL BINARY COMPARATOR

Filed Aug. 27, 1963 2 Sheets-Sheet 1

INVENTOR.
WILLIAM H. BAYNES
BY R. E. Geangue
ATTORNEY

March 7, 1967 W. H. BAYNES 3,308,277
TIMING DEVICE UTILIZING ELECTRO-MECHANICAL
BINARY COMPARATOR
Filed Aug. 27, 1963 2 Sheets-Sheet 2

INVENTOR.
WILLIAM H. BAYNES
BY R. E. Geauque
ATTORNEY 3,308,277
Patented Mar. 7, 1967

3,308,277

TIMING DEVICE UTILIZING ELECTRO-MECHANICAL BINARY COMPARATOR

William H. Baynes, 4122 Greenbush Ave., Sherman Oaks, Calif. 91403

Filed Aug. 27, 1963, Ser. No. 304,787
1 Claim. (Cl. 235—92)

This invention relates to a timing device, and more particularly to a timing device employing a new and novel mechanical binary comparator to control the operation of a mechanical programmer of the type which stores programmed information on punched cards or punched tape.

Certain prior art untimed programming devices permit the storage of program information on punched cards or punched tape and the readout of this data is accomplished mechanically by the presence or absence of punched holes at particular spots on the data storage card or frame. The number of electrical circuits which can be handled by such a programmer is very large and is limited only by the physical area of the data storage card. Relatively complex and expensive timing devices are required to control such programming devices over a plurality of steps having varying time intervals between steps and with high accuracy independent of the timed period. With a device of the present invention, on the other hand, a standard, untimed programmer is accurately time-controlled with a relatively simple and inexpensive timing device.

Accordingly, it is a primary object of the present invention to provide a new and useful timing device.

Another object of the present invention is to provide a relatively simple and inexpensive timing device for controlling the operation of a multi-circuit programming device in such a manner that a plurality of individual circuits may be controlled over a plurality of steps having varying time intervals between steps.

Yet another object of the present invention, is to provide a new and useful mechanical binary comparator.

A further object of the present invention is to provide a new and useful mechanical binary counter.

A still further object of the present invention is to provide a new and improved timed programming device.

According to the present invention, a mechanical counting device is constructed to read in binary code rather than in decimal units. The mechanical binary counter has the same appearance as a decimal counter except that each counter cylinder has only two positions, marked "0" and "1," rather than the ten positions of the decimal counter cylinders. The first cylinder on the right indicates unity or "two raised to the zero power." The next cylinder refers to two or "two raised to the first power." Successive cylinders to the left represent the values of two raised to successive higher powers. At the start of the counting sequence, all cylinders read zero. As the count moves to one, the first cylinder rotates 180 degrees to read 1. As the count moves to two, the first cylinder rotates to zero and the second cylinder moves to 1. Each motion of any cylinder from the "1" position to the "0" position causes the adjacent cylinder to its left to advance half a revolution or one unit.

Each counter cylinder is provided with cam surfaces projecting from opposite points on the curved surface of the cylinder. One cam surface closes one set of contacts when a zero is indicated and the other cam surface closes another set of contacts when a "1" is indicated. Each counter cylinder and its switches are paired with a solenoid operated relay which operates a single-pole double-throw switch. This switch has only two positions and is set by an electrical signal from a programming device of the punched card or tape type. One position corresponds to a binary "1" and the other position corresponds to a binary "0." Two solenoids are attached to each relay. One solenoid, when activated, places the switch in the binary zero position and the other solenoid, when activated, places the switch in the binary "1" position. The combination of a single counter cylinder, its switches, the solenoid operated relay and its switches is called a binary counter group. Each binary counter group is so connected electrically that its signal current may pass only when both the counter cylinder and the relay switch are in the same binary position. Two adjacent binary counter groups with the electrical signal path connected in series will pass a signal only when each group has the same binary indication on both counter cylinder and the relay. Likewise, a set of any number of counter groups will pass a signal only if there is an exact binary correlation between the counter cylinder numbers and the relay set numbers. The relays are set on predetermined signals from a programming device and when the binary counter reaches the set number, a coincidence signal is sent to an electrical motor which advances a punched data tape one frame in the programming device. Upon receipt of the electrical signal from the counter-relay combination, the programmer first transmits a single, relay-clearing signal to the bank of relays which causes all relays to move to or remain in the binary "zero" position. Immediately following this relay-clearing signal, the programmer transmits a group of signals to place selected relays in the binary "one" position, corresponding in binary code to the elapsed time predetermined from the program time-zero for the subsequent program advance to the next programmed step.

The inherent accuracy of any timing device is directly related to its time reference. The most reliable time reference is the normal electrical power frequency of 60 cycles per second. The precision control of this power frequency is such that it has become the standard time reference for all applications except the most precise which require millisecond accuracy or better. Therefore, the device of the present invention uses a synchronous electric motor which transforms the 60-cycle time standard into shaft rotation of the same basic timing accuracy. The accuracy of this device in timing a predetermined period is a dual function of its time reference and the precision with which the switch operated by the lowest order binary counter cylinder can be set to indicate terminal coincidence. A cam and switch accuracy of one percent of a revolution is well within normal manufacturing tolerances. This accuracy would indicate a timing accuracy for any period of about one percent of the time base whether seconds, minutes or hours. Timed periods of 30,000 minutes or 5 minutes would both have the same overall accuracy of one hundredth of a minute or 0.6 second.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figures 1, 2:
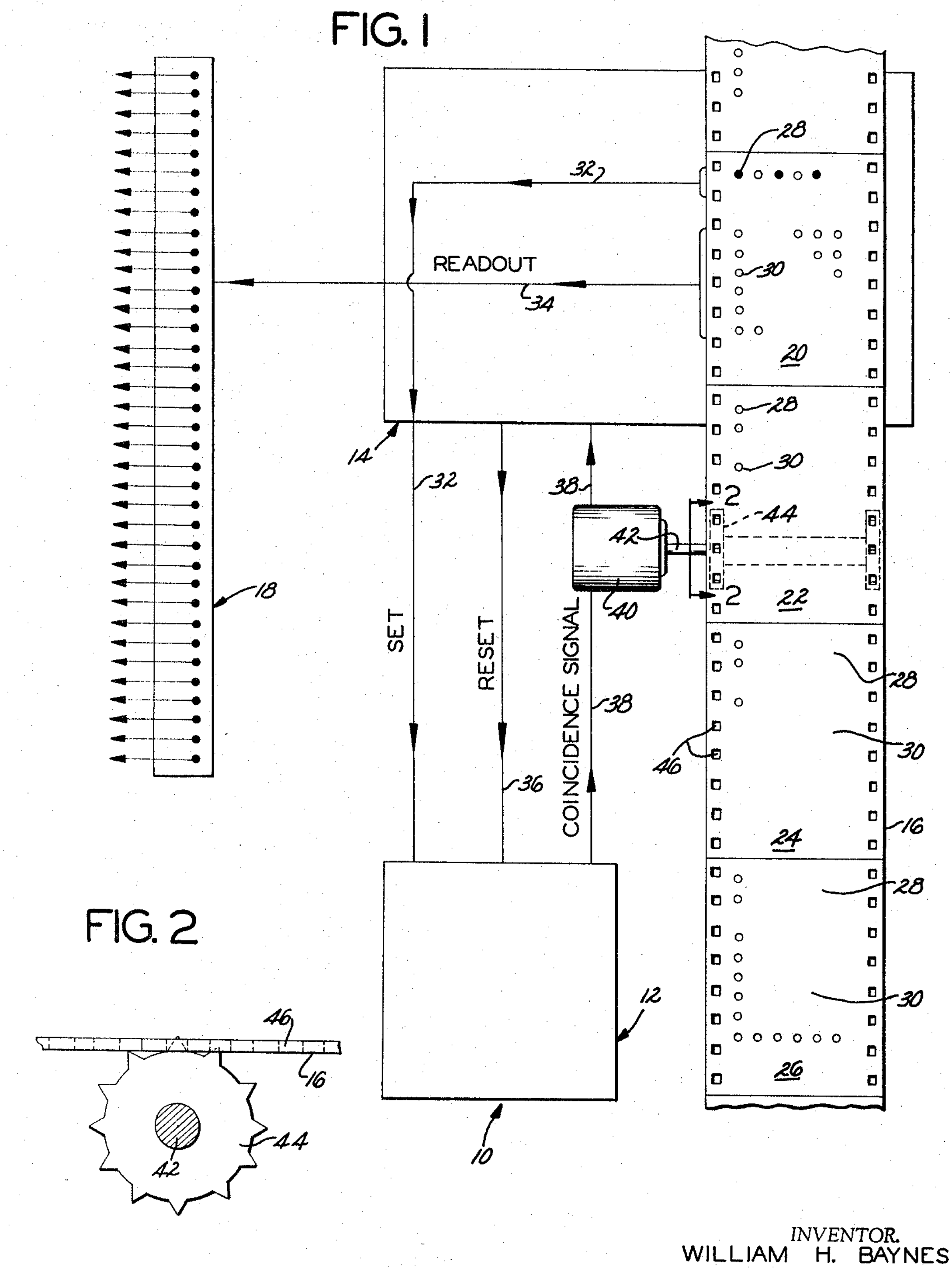
FIGURE 1 is a diagrammatic view of a mechanical binary comparator and programming device of the present invention.
FIGURE 2 is a cross-sectional view taken along line 2—2 of FIGURE 1.
Figures 3, 4, 5, 6:
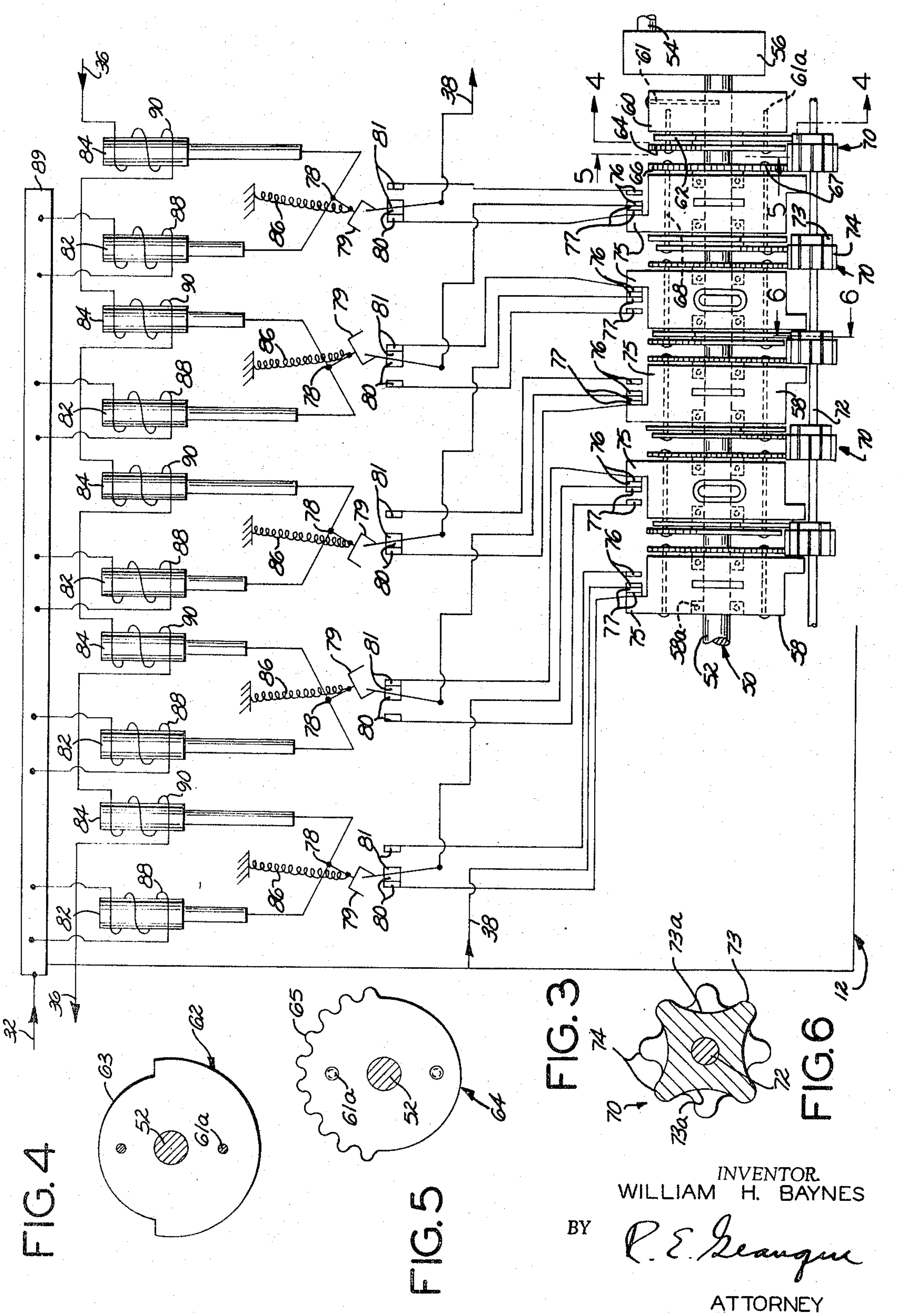
FIGURE 3 is a plan view, showing somewhat schematically, a binary comparator of the present invention.
FIGURE 4 is a cross-sectional view taken along line 4—4 of FIGURE 3.
FIGURE 5 is a cross-sectional view taken along line 5—5 of FIGURE 3.
FIGURE 6 is a cross-sectional view, on an enlarged scale, taken along line 6—6 of FIGURE 3.

Referring again to the drawings and more particularly to FIGURES 1 and 2, the timing device of the present invention, generally indicated 10, includes a mechanical binary comparator 12 which is connected electrically to a mechanical programming device 14. The programming device 14 includes a punched tape 16 which controls the operation of a plurality of program circuits 18.

The punched tape 16 includes a plurality of frames 20, 22, 24 and 26, respectively. Each frame has a word block comprising a binary time readout 28 and a programmed circuit readout 30. An electrical circuit 32 sends set signals from the binary time readout 28 to the mechanical binary comparator 12. The "set" signals apply a predetermined time in binary code to the bank of relays of a mechanical binary comparator, to be hereinafter described, to indicate the time of program transfer from frame 20 to frame 22 and in a like manner for succeeding frame transfers. An electrical circuit 34 connects the programmed circuit readout 30 to the programmed circuits 18 and transmits the program punched into the programmed circuit readout section 30 of the frames 20–26. An electrical circuit 36 transmits a reset signal from the programming device 14 to the mechanical binary comparator 12 to clear a group of relay switches, to be hereinafter described, when the program of frame 20 has been completed. A circuit 38 connects the mechanical binary comparator 12 to an electric motor 40 and to the programming device 14. The motor 40 has a shaft 42 on which sprockets 44 are rigidly affixed. The sprockets 44 engage apertures 46 in the tape 16 and advance the tape 16 by one data frame in response to a time coincidence signal transmitted over circuit 38 from the comparator 12.

Referring now to FIGURES 3–6, the mechanical binary comparator 12 includes a binary counter 50 having a shaft 52 which is driven at a predetermined speed by a powered input shaft 54 operating through a gear box 56. The gear box 56 gears the time input from the shaft 54 to a predetermined value so that the shaft 52 will rotate in accordance with a predetermined time base such as seconds, minutes or hours. For purposes of illustration, but not of limitation, it will be assumed that the shaft 52 is rotated at the rate of one revolution per minute. The mechanical binary counter 50 has the general appearance of a decimal counter except that each counter cylinder 58 has only two positions marked "0" and "1" rather than the ten positions of the decimal counter cylinder. The first counter cylinder on the right, as viewed in FIGURE 3, indicates unity or "two raised to the zero power." The next cylinder refers to two or "two raised to the first power." Successive cylinders to the left present values of two raised to successively higher powers and any desired number of cylinders may be employed. At the start of the counting sequence, all cylinders read zero.

A driven disc 60 is keyed to the shaft 52 by a pin 61 and is driven by the shaft 52. A first indexing disc 62 is a circular plate with a radial recess 63 extending over a sector of 162 degrees or nine twentieths of its circumference and is keyed to the disc 60 by pins 61*a*. A second indexing disc 64 carries a gear tooth sector having ten teeth with 18-degree spacing between teeth and is likewise keyed to the disc 60 by pins 61*a*. Indexing discs 62 and 64 are contiguously attached to the disc 60 in an angular orientation such that the radial recess 63 of disc 62 is in radial conjunction with the gear tooth sector 65 of disc 64. Each counter cylinder 58 is rotatably mounted on shaft 52 by bearings 58*a* and carries a ring gear 66 on one end. Each gear 66 has 20 teeth 67. Each cylinder 58, except the last one to the left, as viewed in FIGURE 3, also carries identical sets of discs 62 and 64 on its other end. The discs 62 and 64 and the ring gears 66 are keyed to the cylinders 58 by pins 68. The cylinders 58 are arranged on shaft 52 in such a manner that a ring gear 66 is adjacent a preceding set of discs 62 and 64. An idler gear 70 is rotatably mounted on an idler shaft 72 adjacent each ring gear 66 and its associated discs 62 and 64. Each idler gear 70 includes four teeth 73 on one end and eight teeth 74 on its other end and forms a train of gears with an associated set of gears comprising a ring gear 66 and discs 62 and 64. As the shaft 52 completes one-half revolution, its associated disc 64 will come into driving engagement with the right hand idler gear 70, as viewed in FIGURE 3, causing it to rotate the right-hand cylinder 58 one-half a revolution as shaft 52 completes its revolution. This exposes the numeral "1." The disc 64 on the right-hand cylinder 58 also turns one-half a revolution. The periphery of disc 62 rides in one of the arcuate recesses 73*a* formed between the four teeth 73 of gear 70 to prevent it from rotating until disc 62 rotates sufficiently to bring the radial recess 63 around to gear 70 so that a tooth 73 drops into recess 63. The gear 70 is free to be driven by sector 65 to, in turn, rotate gear 66. As the shaft 52 completes one-half of its second revolution, its associated disc 64 will again come into driving engagement with the right-hand idler gear 70 causing it to rotate the right-hand cylinder 58 another one-half revolution to expose a zero. The disc 64 on the right-hand cylinder 58 turns another one-half revolution during which the gear sector 65 of disc 64 is in driving engagement with its associated idler gear 70. This rotates the cylinder 58 which is adjacent the right-hand cylinder 58, as viewed in FIGURE 3, one-half a revolution to expose the numeral "1" at the same time the right-hand cylinder 58 is moving to zero. Continued rotation of shaft 52 imparts rotation to the remaining cylinders 58 in like manner. Thus, as the count of shaft 52 moves to 1 the first or right-hand cylinder 58 rotates 180 degrees to read 1. As the count progresses to 2, the right-hand cylinder rotates to zero and the adjacent cylinder moves to 1. The rotation of any cylinder from the 1 position to the 0 position causes the adjacent cylinder to its left to advance half a revolution. The above discussion has considered the operation of the binary counter 50 only in an additive function. However, the mechanical operation of this counter is reversible and it will accept and indicate both positive and negative input shaft rotations for such application as require an algebraic total of both positive and negative inputs.

Each cylinder 58 has a pair of cams 75 projecting from opposite points on the curved surface of the cylinder. One cam 75 closes a first set of electrical contacts 76 when a "0" is indicated on a cylinder 58. A second set of contacts 77 is closed by the other cam 75 when a "1" is indicated on a cylinder 58.

Each cylinder 58 and its contacts 75 and 76 are paired with a solenoid operated relay 78 which operates a single-pole double-throw switch 79. Each relay 78 has only two positions and is set by a "set" signal received over circuit 32 from the programmer 14. When a switch 79 is thrown to its left-hand position, viewed in FIGURE 3, a first pair of electrical contacts 80 is closed. When a switch 79 is thrown to the right, a pair of electrical contacts 81 is closed. The left-hand position of a switch 79 corresponds to a binary 1, which is referred to hereinafter as a "set" position and the right-hand position of a switch 79 corresponds to a binary 0, which is referred to hereinafter as a "clear" position. A "set" solenoid 82 and a "clear" solenoid 84 are attached to each relay 78. The "set" solenoid 82, when activated, through circuit 32, will place the switch 79 in the left or binary 1 position. The absence of a signal to the set solenoid 82 will leave the switch 79 in the binary 0 position. Each switch 79 is connected to a spring 86 which biases it to its last position in the absence of current to the solenoids 82 and 84.

The coils 88 of the set solenoids 82 are wired to a panel 89 which, in turn, is connected to circuit 32 so that each solenoid 82 can be individually set by a suitable set signal. The coils 90 of solenoids 84 are wired in series and are connected to the reset circuit 36 so that all solenoids 84 will be energized simultaneously from the reset signal received from the programmer 14 to reset the electrical switches 79 to their binary zero positions at the completion of each program set into the data frames 20–26. The contacts 76, 77, 80 and 81 are connected within the coincidence signal circuit 38 in such a manner that current may pass to the motor 40 to move a frame only when both the counter cylinders 58 and the relay switches 79 are in the same binary positions.

Operation of the device will be readily understood. The binary time readout 28 in frame 20 is punched in such a manner that an electric signal traveling over the set circuit 32 will activate the right-hand solenoid 82, as viewed in FIGURE 3, positioning the right-hand switch 79 to its set position. The bit in the binary readout 28 for the solenoid 82 which is adjacent the right-hand solenoid 82 is not punched so that a signal is not sent over the circuit 32. Accordingly, the switch 79 adjacent the right-hand cylinder 58 remains in the binary 0 position. The next adjacent bit in the binary time readout 28 in this example is punched so that the next adjacent solenoid 82 will be activated to position its associated switch 79 to the left in the set position. The next adjacent bit is not punched so that the next adjacent solenoid 82 will remain de-activated and its switch 79 will remain in its zero position. The last bit is punched so that the left-hand solenoid 82 will be activated to position its switch 79 to its set position. The binary time code used for this illustration is 1–0–1–0–1 which corresponds to the sum of $2^4+2^2+2^0=16+4+1=21$ in decimal units. The schematic representation of the mechanical binary comparator in FIGURE 3 has been limited to five counter groups for illustrative purposes. However, the invention herein described is intended to consist of as many counter groups as required to indicate the time requirements of any timed program sequence.

Shaft 52 is then rotated setting the counting mechanism 50 into operation. It continues to run until the program punched into the programmed circuit readout 30 has been completed at which time the actual elapsed time corresponds to the set time when the counters 58 will be in the positions shown in FIGURE 3 wherein the coincidence circuit is completed through circuit 38 to motor 40 energizing the motor causing the sprocket wheel 44 to advance tape 16 until the frame 22 comes into position in programmer 14. Also, a reset signal is sent through circuit 36 to energize all of the solenoids 84 and return all of the switches 79 to zero. At this time, the punched bits in binary time readout 28 of frame 22 will send a set of signals through the set circuit 32 to the comparator 12 which sets the time required for the second stage of the operation programmed into tape 16.

While the particular timing device herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claim.

What is claimed is:

A mechanical binary comparator comprising:
- a plurality of counter cylinders having first cams mounted on the periphery thereof in a predetermined location and second cams mounted on the periphery thereof at a location 180° from said first cams;
- a timed input shaft connected to said counter cylinders for rotating said cylinders on a predetermined time base to indicate elapsed time in binary code;
- a first pair of contacts adjacent each cylinder and adapted to be closed by said first cams;
- a second pair of contacts adjacent each cylinder and adapted to be closed by said second cams;
- a set solenoid and a reset solenoid for each relay;
- a double throw switch connected to the solenoids for each relay;
- a third pair of contacts adjacent each of said switches and adapted to be closed by a respective switch when a respective set solenoid is energized;
- a fourth pair of contacts adjacent each of said switches and adapted to be closed by a respective switch when a respective reset solenoid is energized; and
- circuit means connecting all of said contacts together in such a manner that said comparator issues a coincidence signal when the positions of said counter cylinders correspond to the position of said double throw switches.

References Cited by the Examiner

UNITED STATES PATENTS

| | | | |
|---|---|---|---|
| 2,656,497 | 10/1953 | Schweighofer et al. | 318—19 |
| 2,676,289 | 4/1954 | Wulfsberg et al. | 318—8 |
| 2,796,566 | 6/1957 | Maynard et al. | 318—28 |
| 2,798,994 | 7/1957 | Dicke | 318—33 |

MAYNARD R. WILBUR, *Primary Examiner.*

J. F. MILLER, A. L. NEWMAN, *Assistant Examiners.*